INVENTORS
DONALD B. DERR
GORDON W. NEFF
CARLOS J. SAMBUCETTI

BY John Q. Jordan
ATTORNEY

United States Patent Office 3,707,455
Patented Dec. 26, 1972

3,707,455
MEASURING SYSTEM
Donald B. Derr, Peekskill, Gordon W. Neff, Mahopac, and Carlos J. Sambucetti, Mohegan Lake, N.Y., assignors to International Business Machines Corporation, Armonk, N.Y.
Filed July 15, 1968, Ser. No. 744,951
Int. Cl. G01n 27/26, 27/40
U.S. Cl. 204—195 P        6 Claims

ABSTRACT OF THE DISCLOSURE

A differential ion sensitive measuring system is provided to measure the concentration of particular constituents of a fluid. A pair of identical ion sensitive electrodes or probes are used to provide the differential measurement. One of the electrodes is surrounded with a reagent selected to react with the molecules of the fluid constituent under test. Upon contact with the fluid to be analyzed each electrode responds in the same manner to ions in the fluid so as to yield a zero voltage difference from the effects thereof. However, at the electrode surrounded with the reagent the latter reacts with molecules of the constituents under test to produce an ion change thereat not seen by the other electrode. The magnitude of the ion change is indicative of the concentration of the constituent under test.

BACKGROUND OF THE INVENTION

The present invention relates to a method and apparatus for the analysis of constituents of fluids and more particularly to a method and apparatus for measuring the concentration of specific constituents of a fluid using a differential measurement technique. A differential measurement approach for determination of pH has been described in abandoned application Ser. No. 653,393, entitled "pH Detector," and assigned to the assignee of the present application.

Determination of the concentration of specific constituents of fluids, for example biological fluids such as blood, is of great importance in the fields of medicine, biochemistry and chemical processing. For example, the ability to accurately, quickly and simply determine the concentration of certain species, such as glucose or urea, in biological fluids, such as blood, would be a valuable aid to the medical practitioner and diagnostician.

Heretofore, a commonly used analysis process for determining the amount of glucose present in blood involved the catalytic action of the enzyme glucose oxidase on a test sample of blood glucose. In response to the catalytic action, the blood glucose undergoes aerobic oxidation whereby a reaction product of gluconic acid and hydrogen peroxide is formed. The amount of the reaction product formed is a function of the amount of glucose present in the test sample. Likewise, in urea analysis of body fluids the enzyme urease is reacted with a test sample to generate a reaction product, the amount of which is a function of the amount of urea present in the sample.

In each of these tests it was often necessary, prior to effecting a reaction, to use some form of separation process to physically separate certain constituents from the whole blood. Moreover, after the reaction a cumbersome colorimetric test was often used to determine the amount of the reaction product.

The problem with colorimetric testing systems, along with other prior art testing systems used in the analysis of species of fluids, lies in the fact that the measurement approach is not direct but rather involves complicated systems and steps to provide indirect determination. As a result such systems are particularly susceptible to the introduction of error. In some cases it has been questioned whether the test results obtained are truly representative of the composition of the original sample. This is particularly true where the whole fluid has undergone drastic change.

It can be seen that the prior art arrangements are necessarily slow and subject to error. Moreover, relatively large samples are often involved which require preparation prior to test. For example, as heretofore mentioned, in blood analysis dialysis, centrifugation or other forms of separation are often necessary. The end result of such preparation is that a prolonged, inaccurate and unnecessarily complicated test cycle is involved which generally results in the destruction of the test sample. Prior art analysis techniques often not only involved separation steps but also involved accurate preparation of reagents as well as volumetric sample or additions for each test run.

SUMMARY OF THE INVENTION

The present invention overcomes the prior art disadvantages by providing a novel differential ion sensitive testing arrangement wherein small samples of whole fluid may be analyzed without the necessity of involving any complex preparation therefor. "Whole fluid" as used herein means solutions including suspensions therein. The significance of being able to work directly with small samples of whole fluids is evident when it is recognized that such allows a direct "on-line" measurement approach. Thus, a fluid system tapped to provide a continuous sample may be continuously analyzed on a "real-time" basis. Moreover, since the testing system used in accordance with the present invention is non-destructive to the test sample the testing apparatus may be included in the fluid system loop such that the sample is returned to the system.

There is thus provided a differential ion sensitive system for the analysis of particular components of fluids which has the advantages of being simple, direct, rapid and non-destructive to the test sample. Because of the foregoing advantages the system has the additional attendant advantages that it may be used "on-line" with the source of fluid under analysis and even "in loop" with a fluid system.

It is therefore an object of this invention to provide an improved system for the analysis of particular components of fluids.

It is an additional object of this invention to provide a simple and rapid system for the direct measurement of the concentration of particular constituents of fluids.

It is a further object of this invention to provide a simple system for the analysis of components of fluids which system acts on whole fluids.

It is still a further object of this invention to provide a system for the analysis of components of fluids which is non-destructive to the fluid sample under analysis.

It is yet another object of this invention to provide a system for the analysis of particular components of fluids which obviates any need for complex preparation.

It is still yet another object of this invention to provide a system for the analysis of components of fluids which requires small quantities of the sample analyzed.

It is yet a further object of this invention to provide a simple system for the analysis of components of fluids which may be used "on-line" or "in-loop" with a fluids system so as to continuously sample and analyze fluid from the system to provide a direct and immediate indication of the concentration of the components being analyzed.

It is yet still a further object of this invention to provide a system particularly suited to the direct analysis of organic constituents of biological fluids.

These and other objects and advantages, according to the present invention, are achieved by providing a differential ion sensitive system wherein a pair of identical ion sensitive capillary or tube surfaces are used to make contact with the fluid under analysis. Each ion sensitive surface is covered with an electrolyte solution. However, one of the electrolyte solutions contains a reagent to react with the molecules of the particular components being analyzed while the other does not. Upon contact with the fluid sample the reaction caused by the reagent at one of the ion sensitive surfaces generates an ion change thereat, indicative of the concentration of the component under test. The ion change at this ion sensitive surface is measured against the non-reaction ion condition at the other ion sensitive surface.

The foregoing and other objects, features and advantages of the invention will be apparent from the following more particular description of preferred embodiments of the invention, as illustrated in the accompanying drawings.

DESCRIPTION

Figure 1:
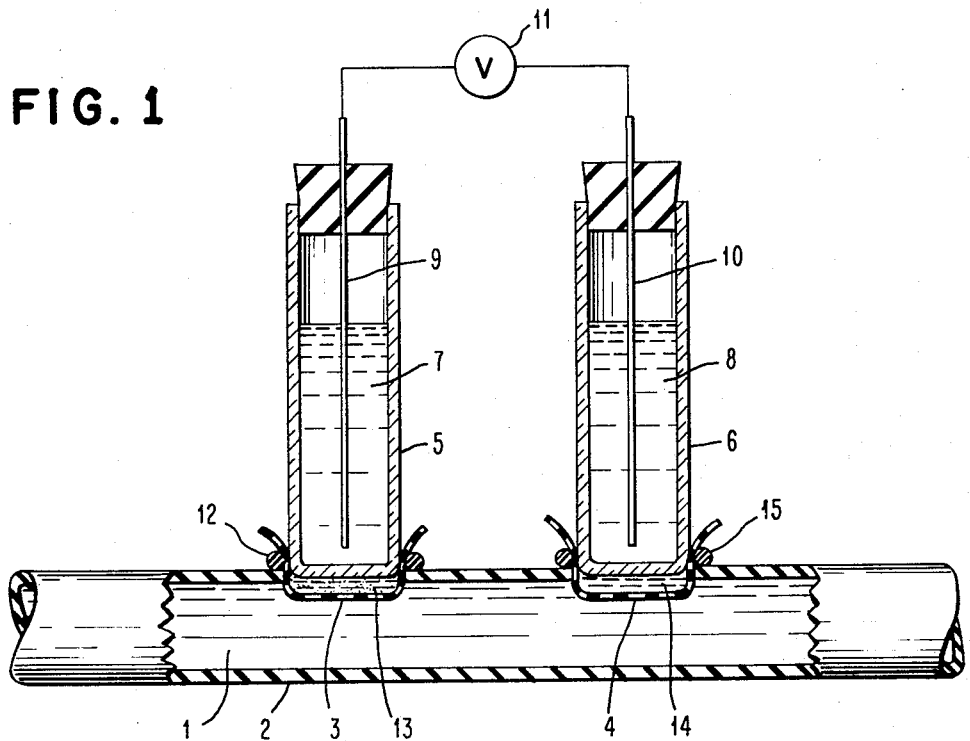
FIG. 1 is a schematic cross-sectional view of one embodiment of the differential ion sensitive analysis system in accordance with the present invention.
Figure 2:
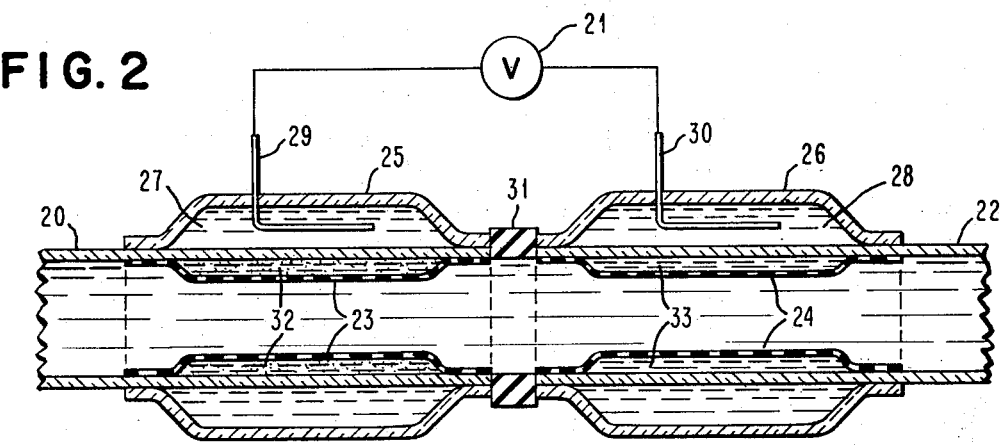
FIG. 2 is a schematic cross-sectional view of an alternative embodiment of the differential ion sensitive analysis system in accordance with the present invention.

The novel concepts of the present invention will become more clear from a general description of the arrangements of FIGS. 1 and 2. The differential two-electrode arrangement is shown in FIG. 1 making contact with fluid sample 1. Any of a variety of types of fluids may be analyzed. For example, biological fluids such as urine, plasma or the like may be analyzed. Also, food processing or chemical processing fluids may be analyzed. The only requirement is that the fluid be sufficiently viscous to seep through membranes 3 and 4, the function of which will be explained hereinafter. Accordingly, the test sample could be close to a penetrable jell. It is to be noted further that the test sample may involve a fixed sample or, as hereinbefore indicated, may involve a changing sample wherein the sample is continuously flowing.

As is evident from FIG. 2, electrodes or probes 5 and 6, as shown therein, are in the form of test tubes or capillaries having closed ends which thereby form a container. However, it is to be understood that the shape of the electrode is in no way significant and any of a variety of electrode shapes could employ the novel concepts of the present invention. For example, the electrodes shown in FIG. 1 could be rounded-bottom containers. It is clear that the whole electrode could be ion sensitive or merely the contact surface portion. Still further, only a sub-portion of the contact surface portion could be ion sensitive. Contrary to the arrangement shown in FIG. 1 the electrodes could also be of a solid form thus eliminating the inner conductive fluid medium 7 and 8.

Any of a variety of well known ion sensitive materials may be used. For example, the electrodes of FIG. 1 could utilize pH sensitive glass as well as any other type of ion sensitive glass or crystal. It has already been determined that semiconductor material also performs successfully as an ion sensitive surface. The use of semiconductor material as a pH sensitive surface is discussed in U.S. Pat. No. 3,219,556, to Arthur et al.

FIG. 2 shows an alternative embodiment utilizing the concepts of the present invention. Rather than use a tube container arrangement, as in FIG. 1, two ion sensitive open capillaries 20 and 22 are used. Cemented to the outer surface of each capillary is a pair of electrolyte chambers 25 and 26.

It is to be remembered, however, that whatever the configuration of the ion sensitive surfaces, it is an important aspect of the present invention that the differential ion sensitive pair used be electrochemically identical. This is in contradistinction to copending application Ser. No. 653,393 wherein the pair of electrodes are electrochemically identical to the point where one electrode demonstrates a significant degree of pH sensitivity while the other, by comparison, demonstrates less or no pH sensitivity. A simple technique for obtaining two identical electrodes, as used in the present invention, is to divide a single tube or capillary section into two sections.

DETAILED DESCRIPTION

In addition to a pair of ion sensitive surfaces or electrodes, FIG. 1 shows a pair of leads 9 and 10. It is evident that leads 9 and 10 may be made from any of a variety of well known conductive materials. It is clear, however, that in particular applications one material may be preferred over others. Thus, where pH sensitive electrodes are used with HCl electrolytes, Ag—AgCl lead might be preferred.

One end of each of leads 9 and 10 is connected to the respective terminals of a high impedance measuring device, such as voltmeter 11. The other ends of leads 9 and 10 are each respectively coupled to the inner surfaces of the ion sensitive electrodes 5 and 6, via the respective electrolyte buffer solutions 7 and 8.

With reference to electrode 5 it can be seen that between the ion sensitive contact surface of electrode 5 and test sample 1 there is provided a membrane 3. Membrane 3 is semipermeable and arranged to provide a flat chamber region between sample 1 and the ion sensitive surface of electrode 5. Grommet 12 slips over electrode 5 to hold the membrane in place, as shown in FIG. 1. Within the chamber formed by membrane 3 and the ion sensitive surface of electrode 5 an electrolyte and a specified reagent are provided such that the membrane tends to hold the electrolyte-reagent system 13 captive against the ion sensitive surface. A rubber washer or nylon mesh may be used as a spacer between the membrane and ion sensitive surface.

The purpose of the reagent is to cause generation of a reaction with the molecules of the particular component of the fluid test sample, the concentration of which is to be determined. The reaction product thus generated causes a change in the ion concentration of the captive electrolyte. This ion change is sensed by ion sensitive electrode 5 and has been found to be proportional to the concentration of the fluid component under test.

It is clear from the above discussion that the choice of the reagent used is necessarily dependent upon the chemical nature of the fluid component being analyzed. For example, when it is desired to determine the amount of glucose in blood the enzyme glucose oxidase would provide an effective catalytic reagent to cause generation of a gluconic acid-hydrogen peroxide reaction product. Likewise, urease would provide an effective catalytic reagent, to cause production of an ammonium carbonate reaction product, where the amount of urea in blood is to be determined.

As can be seen from inspection of FIG. 1, membrane 4 at electrode 6 provides a structurally similar arrangement to that of membrane 3 at electrode 5. Grommet 15 holds membrane 4 in a manner akin to that described with reference to grommet 12 at electrode 5. However, membrane 4 in this instance, holds only the electrolyte buffer solution 14 captive against the ion sensitive surface of electrode 6 with no reagent present therein. Thus no reaction can be generated thereat. It is to be noted that the characteristics of membrane 3 are the same as membrane 4. Furthermore, the characteristics of electrolyte 14 are the same as electrolyte 13 and the characteristics of lead 9 are the same as lead 10. Thus, the electrode system connected between one side of meter 11 and fluid test sample 1 is electrochemically the same as the electrode system connected between the other side of meter 11 and fluid test sample. 1.

Membranes 3 and 4 are characterized by being permeable at least to the molecules of the fluid component under analysis but impremeable to the molecules of the reagent held thereby. Thus, whereas an enzyme reagent is used a cellophane membrane will prevent the large protein molecules of the enzyme from diffusing into the fluid test sample but will allow the ions and molecules from the fluid test sample to diffuse to the enzyme held captive by the membrane in an electrolyte solution. In this respect it is noted that a minor amount of the electrolyte held captive by the membrane may diffuse into the fluid. However, since such diffusion occurs in the same amount at each electrode the net effect on the measurements taken is zero. It is evident that if an electrolyte is selected, here, that is similar to the fluid under test, such diffusion would be minimal.

From the above example it can be seen that semi-permeable membranes 3 and 4 may also pass any of a variety of ions present in the test sample. However, as will be explained hereinafter, the effect on potential of these ions will be the same at each electrode and will therefore provide a zero net effect across leads 9 and 10. Thus, ion activity or variations in ion activity of the test sample, as well as other external conditions, will not introduce error into the measurement because of the identical characteristics of each electrode. In this respect it can be seen that the ion sensitive electrodes used need not be sensitive only to the ion undergoing change by the reaction generated at one electrode but must be at least sensitive to such an ion.

From the above description of the arrangement in FIG. 1 it can be seen that when electrodes 5 and 6 come into contact with test sample 1 various ions in the test sample may penetrate membranes 3 and 4 to effect a potential change at each electrode. However, because each electrode-membrane arrangement has the same characteristics, each is subject to the same ionic effect and, accordingly, each effects the same potential change. Such ionic influences, therefore, fail to provide a voltage difference across voltmeter 11.

However, it should be remembered that since membrane 3 also holds a reagent which reacts with a given molecule in the test sample, an additional ion change is effected at the ion sensitive surface of electrode 5. The resultant reaction product causes a change in the ion level of the captive electrolyte solution holding the reagent. It is known that the amount of reaction product generated is a function of the concentration of the species under analysis. It is also known that the amount of reaction product generated is reflected in a proportional ion change in the electrolyte and thus in the potential change sensed by electrode 5.

Since electrode 6 fails to sense the induced ion change, a difference voltage is generated between electrodes 5 and 6. The magnitude of the voltage change indicated by voltmeter 11 is, thus, proportional to the concentration of the component of the test fluid being analyzed.

In one example, using the arrangement of FIG. 1, two different quantities of glucose were added to an electrolyte similar to blood. This electrolyte was made up of an isotonic saline solution with 30 milli-equivalents per liter of bicarbonate added thereto. The leads 9 and 10 of FIG. 1 were each Ag—AgCl. HCl was used as the electrolyte buffer solutions designated 7 and 8 in FIG. 1. $KH_2PO_4$ was further used as the captive electrolyte solutions 13 and 14. Electrolyte solution 13 also contained a quantity of the enzyme glucose oxidase.

The first sample used 100 mg. of glucose per 100 cubic centimeters of saline solution and a 90 mv. voltage change was produced thereby. The second sample used 1000 mg. of glucose per 100 cubic centimeters of saline solution and an 81 mv. change was produced thereby. The 9 mv. difference between these two samples was found to be more than enough to allow accurate measurement of differences in glucose concentration within the concentration range used.

The arrangement of FIG. 2 operates in principle the same as FIG. 1. The annular chambers formed by the outer surface of capillaries 20 and 22 and the inner portion of molded annular pieces 25 and 26 is filled with an electrolyte buffer solution 27 and 28. Capillaries 20 and 22, and the corresponding molded pieces 25 and 26, are electrically insulated from each other by insulator 31. Leads 29 and 30, emersed in respective electrolyte solutions 27 and 28 at one end thereof, are also connected to a high impedance voltmeter 21 at the opposite ends thereof.

Membranes 23 and 24, as in FIG. 1, hold captive against the ion sensitive surfaces of capillaries 20 and 22, the respective electrolyte solutions 32 and 33. However, for reasons hereinbefore discussed electrolyte solution 32 also contains a reagent while electrolyte solution 33 does not.

Other than differences in physical configuration the arrangement of FIG. 2 is the same as that of FIG. 1 with the same concepts, functions and principles of operation applicable thereto.

While the invention has been particularly shown and described with reference to preferred embodiments thereof, it will be understood by those skilled in the art that various changes in form and details may be made therein without departing from the spirit and scope of the invention.

What is claimed is:

1. A single potentiometric cell system for differentially determining the concentration of a constituent of a fluid comprising:

first and second chamber means separate from one another and each comprising one half of said single cell with each of said chamber means having an exterior ion sensitive surface selectively sensitive to the same types of ions as the other including a known ion type;

first and second output means including electrolyte buffer solution means occupying, respectively, the first and second chambers of said first and second chamber means for providing respective potentials thereat proportional to the ions sensed by the respective said ion sensitive surfaces of said first and second chamber means;

first and second electrolyte means having the same electrolytic characteristics;

reagent means to cause a reaction involving the molecules of said constituent to produce said known ions in number proportional to the concentration of said constituent;

first membrane means, permeable to said molecules and impermeable to said reagent means, for holding both said first electrolyte means and said reagent means against said ion sensitive surface of said first chamber means so that said surface senses said known ions to produce a potential at said first output means having at least a component thereof indicative of the said number of said known ions produced by said reaction;

second membrane means, having characteristics matching said first membrane means, for holding said second electrolyte means against said ion sensitive surface of said second chamber means to produce a potential at said second output means not including said component; and voltage measuring means coupled between said first and second output means so that contact of said first and second ion sensitive surfaces with said fluid through said first and second membrane means and said electrolyte means causes a voltage measurement of said component to be made thereat which component is indicative of the number of ions at said first ion sensitive surface caused by said reaction.

2. A single potentiometric cell system for measuring the concentration of a given constituent of a fluid by differentially determining the potential induced across the respective half-cells of said single cell when each of said half-cells is in contact with said fluid through an electrolyte and semipermeable membrane, comprising:
first and second ion sensitive surfaces separate from one another and arranged to form the respective transducing portions of said half-cells with each of said surfaces made of the same type ion sensitive material as the other, and with said material being selectively responsive to a given ion type to produce a potential at least a part of which is indicative of the number of ions of said given ion type;
first and second output means respectively contacting the material of said first and second ion sensitive surfaces to obtain the respective potentials produced thereby;
reagent means selectively responsive to the molecules of said constituent to produce ions of said given ion type in number proportional to the concentration of said constituent;
first and second quantities of electrolytic solution each having the same electrolytic properties as the other;
first semipermeable membrane means permeable to said molecules and impermeable to said reagent means arranged to hold both said first quantity of electrolytic solution and said reagent means contained therein in contact with said first ion sensitive surface and isolated from said second ion sensitive surface so that said first ion sensitive surface senses the said ions of said given ion type produced in said first electrolytic solution by said reagent means to provide a potential at said first output means having at least a component of which is indicative of the number of the said ions of said given type produced by said reagent;
second semipermeable membrane means having the same membrane characteristics as said first membrane and arranged to hold said second quantity of electrolytic solution in contact with said second ion sensitive surfaces and isolated from said first ion sensitive surface so as to produce a potential at said second output means without said component; and
means to measure the difference between the potential produced at said first and second output means, said difference in potential providing a measure of said component, which measure is indicative of the concentration of said constituent.

3. The single cell system as set forth in claim 2 wherein said ion sensitive material is a pH sensitive material.

4. The single cell as set forth in claim 3 wherein said pH sensitive material is a pH sensitive glass.

5. The single cell system as set forth in claim 3 wherein said reagent is an enzyme and said fluid is a biological fluid.

6. The single cell system as set forth in claim 5 wherein said enzyme is glucose oxidase, said biological fluid in whole blood and second first and second semipermeable membrane means are impermeable to said glucose oxidase and permeable to blood glucose.

References Cited

UNITED STATES PATENTS

| | | | |
|---|---|---|---|
| 751,897 | 2/1904 | Bodländer | 23—232 |
| 3,306,837 | 2/1967 | Riseman et al. | 204—195 |
| 3,398,066 | 8/1968 | Ilani | 204—195 X |
| 3,403,081 | 9/1968 | Rohrback et al. | 204—1 |
| 3,406,102 | 10/1968 | Frant et al. | 204—195 X |
| 3,431,182 | 3/1969 | Frant | 204—195 X |
| 3,438,886 | 4/1969 | Ross | 204—195 |
| 3,479,255 | 11/1969 | Arthur | 204—1 |
| 3,502,559 | 3/1970 | Alexander | 204—195 |
| 3,539,455 | 11/1970 | Clark | 204—1 T |

OTHER REFERENCES

Leland C. Clark, Jr. et al.: Annals of the New York Academy of Sciences, vol. 102. article 1, pp. 39–41 (1962).

James J. Lingane: "Electroanalytical Chemistry," p. 14 (1958).

GERALD L. KAPLAN, Primary Examiner

U.S. Cl. X.R.

204—1 T